United States Patent
Cheriton et al.

(10) Patent No.: US 10,243,855 B2
(45) Date of Patent: *Mar. 26, 2019

(54) EFFICIENT RELIABLE DISTRIBUTED FLOW-CONTROLLED EVENT PROPAGATION

(71) Applicant: OptumSoft, Inc., Menlo Park, CA (US)

(72) Inventors: David R. Cheriton, Palo Alto, CA (US); Hugh W. Holbrook, Palo Alto, CA (US)

(73) Assignee: OptumSoft, Inc., Menlo Park, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 15/372,119

(22) Filed: Dec. 7, 2016

(65) Prior Publication Data

US 2017/0093725 A1 Mar. 30, 2017

Related U.S. Application Data (63) Continuation of application No. 13/652,119, filed on Oct. 15, 2012, now Pat. No. 9,547,533.

(51) Int. Cl.
*G06F 9/54* (2006.01)
*H04L 12/803* (2013.01)
*H04L 12/825* (2013.01)
*H04L 12/835* (2013.01)

(52) U.S. Cl.
CPC ............ *H04L 47/125* (2013.01); *G06F 9/542* (2013.01); *H04L 47/25* (2013.01); *H04L 47/30* (2013.01)

(58) Field of Classification Search
CPC ........ H04L 47/125; H04L 47/30; H04L 47/25
See application file for complete search history.

(56) References Cited

U.S. PATENT DOCUMENTS

| | | | | |
|---|---|---|---|---|
| 6,038,215 A | * | 3/2000 | Uekumasu | H04L 12/5602 370/230 |
| 7,133,369 B1 | * | 11/2006 | Kennamer | H04L 47/15 370/254 |
| 8,825,848 B1 | | 9/2014 | Dotan et al. | |
| 2003/0041046 A1 | | 2/2003 | Allison | |
| 2004/0143823 A1 | * | 7/2004 | Wei | G06F 8/41 717/140 |
| 2004/0215792 A1 | * | 10/2004 | Koning | G06F 9/505 709/229 |
| 2007/0133394 A1 | | 6/2007 | Walton | |
| 2012/0303641 A1 | | 11/2012 | Gudlavenkatasiva | |

(Continued)

FOREIGN PATENT DOCUMENTS

CN 1661524 8/2005

*Primary Examiner* — Michael A Keller
(74) *Attorney, Agent, or Firm* — Van Pelt, Yi & James LLP (57) ABSTRACT

Improved utilization of connections that can be either available or blocked is provided by associating an atemporal connection state with each connection. If a connection is available, messages are transmitted on the connection normally. If a connection is blocked, the atemporal connection state is updated to reflect the changes that were made but not transmitted. In this manner, a record is kept that allows correct transmission of the information when the connection comes back up. More specifically, after a connection status changes from blocked to available, recovery messages are automatically generated from the atemporal connection state and transmitted on the connection.

21 Claims, 3 Drawing Sheets

(56) References Cited

U.S. PATENT DOCUMENTS

2014/0051485 A1\* 2/2014 Wang .................. H04W 4/70
                                                         455/574
2014/0101497 A1   4/2014 Kishimoto
2016/0026511 A1   1/2016 Long \* cited by examiner

EFFICIENT RELIABLE DISTRIBUTED FLOW-CONTROLLED EVENT PROPAGATION

CROSS-REFERENCE TO OTHER APPLICATIONS

This application is a continuation of co-pending U.S. patent application Ser. No. 13/652,119 entitled EFFICIENT RELIABLE DISTRIBUTED FLOW-CONTROLLED EVENT PROPAGATION filed Oct. 15, 2012 which is incorporated herein by reference for all purposes.

FIELD OF THE INVENTION

This invention relates to distributed systems.

BACKGROUND

It is often desirable to transmit information on connections that can be available or blocked. For example, a connection may become overloaded (or even fail), and then come back up at some later time. Conventional message handling approaches can perform poorly in the presence of unreliable connections. For example, dropped event messages can lead to incorrect behavior in distributed processing. Alternative approaches, such as maintaining a centralized state (e.g., in a master server that provides state information on request to clients) can incur other disadvantages, such as increased overhead. Accordingly, it would be an advance in the art to provide improved utilization of connections that can be available or blocked.

SUMMARY

In this work, the above identified problem is addressed by associating an atemporal connection state with each connection. If a connection is available, messages are transmitted on the connection normally. If a connection is blocked, the atemporal connection state is updated to reflect the changes that were made but not transmitted. In this manner, a record is kept that allows correct transmission of the information when the connection comes back up. More specifically, after a connection status changes from blocked to available, recovery messages are automatically generated from the atemporal connection state and transmitted on the connection. Note that such recovery messages need not be identical to the messages that would have been transmitted if the connection had been available. For example, if multiple changes are made to a single element of the connection state while a connection is blocked, a single recovery message will suffice to provide the current value of the state element to a remote location. Also, such recovery messages can be generated immediately after the connection becomes available, or after any time delay.

This approach has important advantages relative to a conventional approach, such as a message buffer. In a conventional message buffer, the time order of the messages is important. For example, let:
message A be "set Y=3"
message B be "set X=Y"
message C be "set Y=5".
Then, the result of the message sequence A, followed by B, followed by C is X=3, Y=5. The result of the message sequence C, followed by B, followed by A is X=5, Y=3, so the result depends on the time order of the messages. Thus a message buffer must keep track of the time order of the messages (e.g., by using a first-in, first-out queue), and if a message buffer is regarded as having state, that state is necessarily ordered with respect to message time.

A disadvantage of such time-ordered state is that its size can grow without bound as the number of messages increases. In practice, a message buffer will have a finite capacity, and various errors can occur if this capacity is exceeded.

Embodiments of the present invention relate to the use of atemporal state relating to connections. Such atemporal state does not have unbounded size as the number of state changes (or messages) increases. More specifically, atemporal state is defined as any state that does not preserve the temporal order in which changes to the state are made. Non-temporal order (e.g., an index sequence of array elements) can be present in such atemporal state. Another example of non-temporal order that can be included in such atemporal state is an order of generating deferred updates for transmission to a remote location.

FIGS. 1a-d show examples of information transmission according to principles of the invention. On FIG. 1a, an initial state is shown, where a local node L1 has corresponding local node state CS1. Local node L1 is connected to remote nodes R1 and R2 via connections C1 and C2 respectively. Here it is convenient to define a remote node as any node that does not have reliable access to the state of local node L1. Such a remote node can be physically remote, or it can be physically local, but not connected to local node L1 by a reliable connection. The connections are capable of reporting their status (e.g., as available or blocked, as shown on FIG. 1a, and/or by providing a numerical value relating to available capacity). The connections each have an atemporal connection state relating to changes to the local node state that have not yet been transmitted to the corresponding remote node. In this example, and in much of the description below, this atemporal connection state is referred to as ancillary state. Ancillary state AS1 corresponds to connection C1, and ancillary state AS2 corresponds to connection C2. In some cases, it is convenient to regard the atemporal connection state as also including the local node state CS1.

Figure 1A:
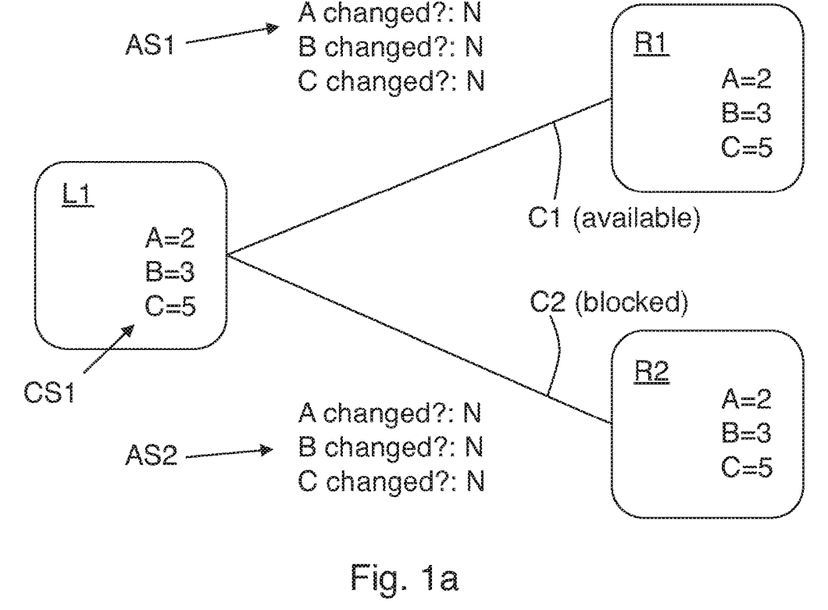
FIGS. 1a-d show an example of operation of an embodiment of the invention in the presence of blocked connections.

In this example, the ancillary state is organized as yes/no bits that are flipped if the corresponding element of the local node state is changed but not transmitted. Connection status is automatically evaluated, and each connection is tagged as blocked or available. For connections that are available, updates are transmitted normally. For connections that are blocked, the atemporal connection state is updated accordingly.

Figure 1B:
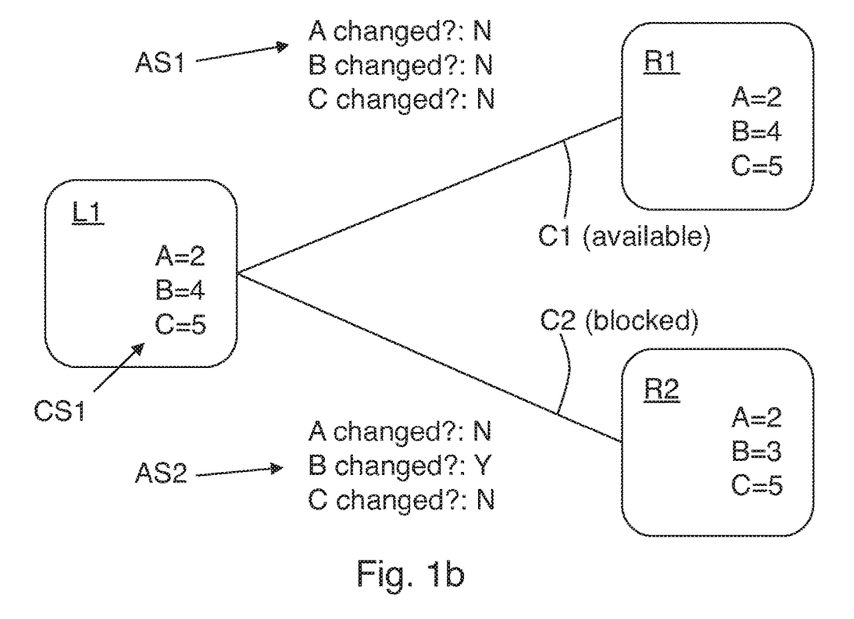

FIG. 1b shows an example of this, where connection C1 is available, connection C2 is blocked, and a state change of element B is performed (B changes from 3 to 4). Since connection C1 is available, this update is transmitted to R1, and the value of B at remote node R1 is updated to 4. However, connection C2 is blocked, so this update is not transmitted to remote note R2 (note that R2 on FIG. 1b has the old value B=3). Instead, ancillary state AS2 is updated to show that B has been changed but not transmitted. Note that AS1 does not show any changes that have not been transmitted. It is apparent that the ancillary state only needs to be updated when a channel is blocked, and that the ancillary state is maintained separately for each connection.

Figure 1C:
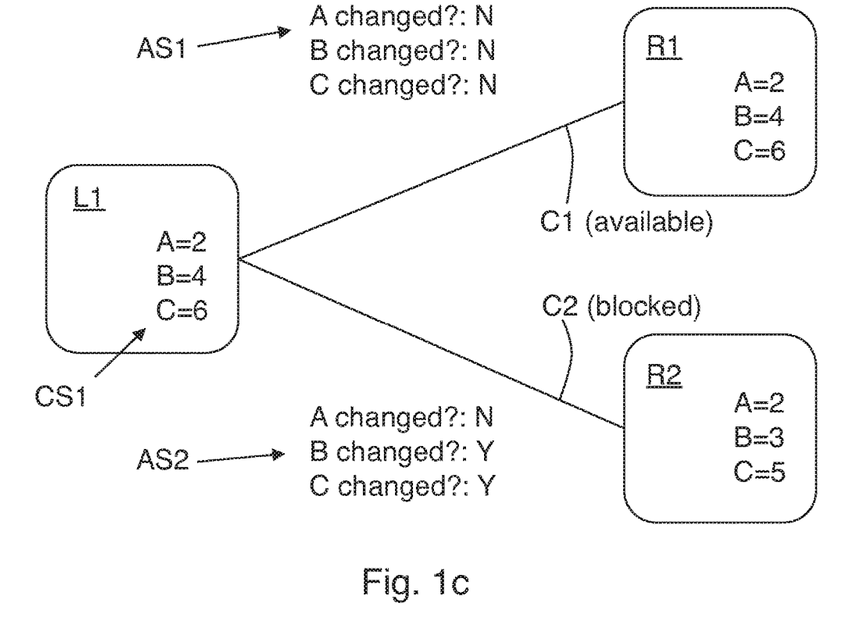

FIG. 1c shows an example of a second change. Here element C of local state CS1 is changed to 6. Again, this change is transmitted to remote node R1 because connection C1 is available. Since C2 is blocked, the change in C is not transmitted to R2. Instead, the bit in AS2 that corresponds to an untransmitted change of C is flipped.

Figure 1D:
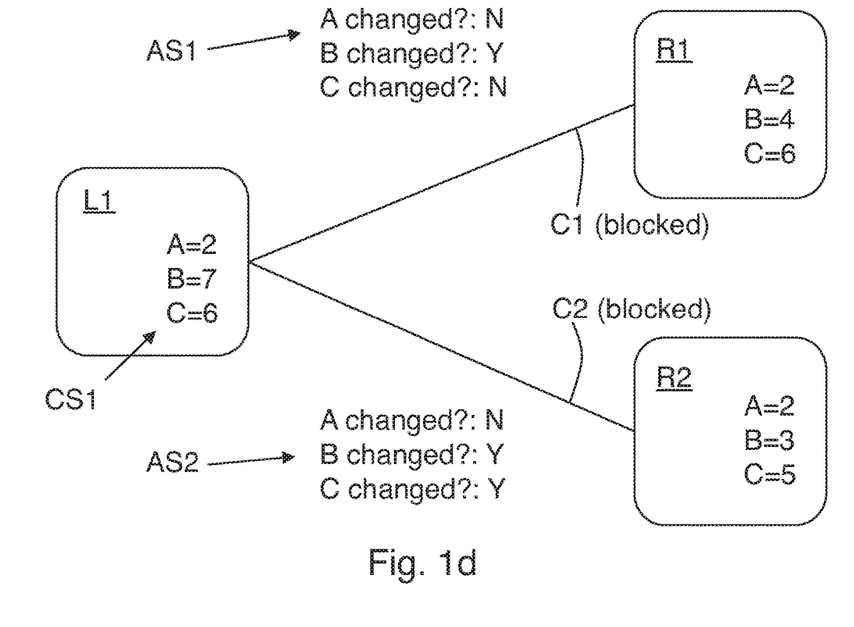

FIG. 1d shows a continuation of this example, where it is now assumed that channel C1 has transitioned from available to blocked, and after this event, there is a change in the value of B from 4 to 7. Here the bit in AS1 that corresponds to an untransmitted change in B is flipped. No change is needed in AS2 (B has already changed, so transmission of its current value when connection C2 comes back up is already needed). From FIG. 1d it is apparent how the remote nodes need to be updated when the connections come back up. AS1 tells us that remote node R1 needs the current value of B, and AS2 tells us that remote node R2 needs the current values of B and C. Thus, the ancillary state (AS1 and AS2) and corresponding state CS1 provide the necessary information for proper transmission of information over connections C1 and C2.

Figure 2:
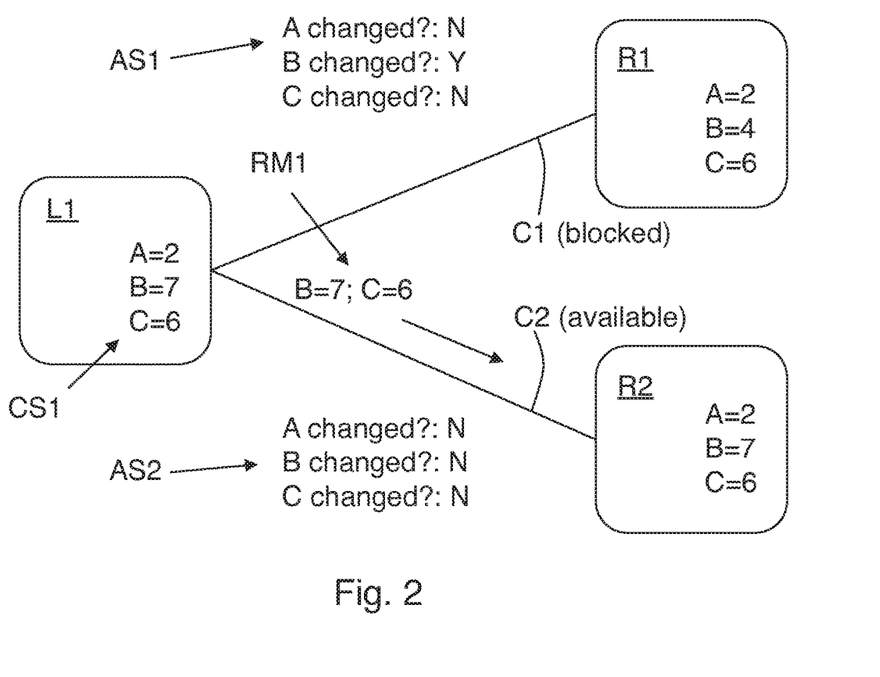
FIG. 2 shows an example of operation of an embodiment of the invention when a connection status changes from blocked to available.

FIG. 2 shows an example of transmission of recovery messages. Here it is assumed that channel C2 has changed from blocked to available. Recovery event messages RM1 are transmitted that transmit current values of elements of CS1 that have been flagged in the ancillary state AS2 (see AS2 on FIG. 1d). After such transmission, AS2 is set to "no untransmitted changes", as shown on FIG. 2.

From this example, some basic features and advantages of the present approach are apparent. An arbitrary number of state changes can be dealt with in a fixed amount of space (e.g., the value of B could change many times while the connections are blocked). Such numerous changes could overflow a conventional message buffer, but cause no trouble with the present approach.

Local changes can be local event messages that are generated by a local event message source. Alternatively, local changes can be local changes in state that have no explicitly formed corresponding event messages. In either case, the present approach is applicable. In cases where local event messages are formed, the present approach entails, for blocked connections, updating the atemporal connection state and then dropping the corresponding local event message.

Preferably, as in the preceding example, the system automatically keeps track of which elements of the local state have untransmitted changes, so that the recovery event message can relate only to the elements of the local state having untransmitted changes. One approach for performing this operation is to maintain ancillary state that identifies elements of the atemporal connection state that have been changed, but not transmitted.

Elements of the local state (or atemporal connection state) can have a pre-determined order, where the recovery event messages are transmitted consistent with this pre-determined order.

Determining which of the connections are available and blocked can be performed according to a transmit decision function that is a function of the reported connection capacities, and possible other factors as well (e.g., message urgency).

The present approach can be practiced in connection with any number of local nodes. In cases where two or more local nodes are present, it is preferred that the corresponding local node states of the local nodes do not overlap. For example, if the state for node 1 gives values for A, B, and C, while the state for node 2 gives values for D, E, and F, there is no overlap. If the state for node 1 gives values for A, B, and C, while the state for node 2 gives values for C, D, and E, there is overlap. If local node state overlap is present, a shared state coherency protocol can be employed to provide a consistent distributed state.

Connection status can be reported as blocked for various reasons. For example, an overloaded (transmission occurring, but message rate exceeds capacity) connection can be reported as blocked. A failed connection (no transmission at all) can also be reported as blocked. Finally, it can be helpful to report a connection as blocked in connection with transaction processing (e.g., to provide atomic transaction processing).

The methods described herein can be implemented in a system having any combination of hardware and/or software configured to perform the indicated functions.

DETAILED DESCRIPTION

A) Introduction

Many computer applications can be characterized informally as "event-driven". That is, some logical event occurs which then causes processing to ensue to respond to this event. For example, in a network switch, the event of a network interface "coming up", i.e. establishing physical connectivity with its peer, needs to cause other components of the switch management to update routing and forwarding entries to accommodate the new interface as well as possibly install packet filtering and statistics mechanisms to manage the traffic arriving on that interface. As another example, a mouse click in an interactive application needs to invoke processing to determine the object being selected by this input event, and then perform further processing corresponding to this particular object.

A common infrastructure for event-driven programming is the provision of event messages, each describing an event, and an event scheduler that determines the order of event processing. Then, for each received event message in turn, the scheduler invokes a callback procedure determined to be associated with that event or classification of this event. With this structure, application processing proceeds by successive invocations of these callback procedures, with these procedures often causing additional events, either directly by generating new event messages, or indirectly by interacting with separate modules that later generate additional event messages.

This structure can be extended to operate across a cluster of computers connected by a network by transmitting event messages between machines using established technology, such as the TCP transport protocol, provided through the so-called sockets interface in many standard computer operating systems.

Although this approach is relatively simple to implement, and efficient in execution in the normal case, it is problematic in the case of overload. In particular, if event messages are generated faster than they can be consumed, the event messages can consume more and more memory to the point of causing system failure if not throttled, effectively overrunning the consumer(s) of the event messages. This overload case can also arise because a consumer of event messages has failed, and so its consumption rate is temporarily zero, until it can be restarted. It can also arise because a consumer of the event messages has blocked further reception because it is performing a transaction. In the normal case, messages are transmitted over a reliable transport protocol so the overload or failure condition is reflected to the source as output buffers to the associated connection being full and not being emptied.

If event messages are dropped by this event message mechanism, there is no means to ensure that the application continues to operate correctly. For example, if an event message indicating that an interface has come up is dropped (to build on this earlier example), the rest of the network switch software may never recognize that this additional network interface is operational, leading to suboptimal, if not incorrect, behavior.

Another approach is to throttle the source of these event messages to prevent this unbounded growth in event messages. I.e. if the local buffers for the connection are full, indicating overload or failure across the connection, the source blocks until the condition clears. However, the source of these events is generally designed to assume that generating an event message is a logically asynchronous action that can never block its execution. This assumption is often core to its correct execution. For example, if blocked, this source module may either fail to detect some events itself or fail to process its own incoming events, causing system-wide problems. Thus, blocking the source is not a usable solution in general.

This problem of excessive event messages can be more pronounced in a distributed application because the source of the event messages can be executing on a separate processor from that of the consumer(s), so is not necessarily slowed down by overload on the consuming side, unlike a non-distributed implementation in which overload or failure can impact both the source and consumer because of their sharing of the processor resources.

One alternative to this so-called "push" model of events is to record the events in some state and allow clients to request updates from this state periodically. In this case, each client "pulls" the information associated with events from some state module that makes it available on demand. In this case, there is no concern about overrunning other modules because each only receives an update when it is requested.

This "pull" model suffers from a number of disadvantages. First, there is extra overhead in the (expected to be) common case when the system is not overloaded. In particular, a client needs to send a message to the module containing the state to request an update and that receiving module needs to process the request and respond with a separate message. This overhead becomes even more significant compared to the "push" solution when there are multiple clients interested in the data and the "push" solution can use some form of multicast (or multipoint delivery) capability. In particular, in this case, the push solution with multicast may allow the source to send a single event message which is multicast to N clients, rather receiving N requests and sending N separate responses. This extra overhead means that a system based on the "pull" approach can end up overloaded at offered load levels that could be handled by an event-driven system without it experiencing overload.

Second, the "pull" model forces each client to effectively trade-off incurring significant overhead to poll for changes in the state frequently against accepting a significant delay in the worst case in detecting a particular event. For instance, if a switch thread is polling the module that indicates that an interface has changed its state from down to up every minute, it may take up to a minute to detect this event, whereas if it polls every 10 milliseconds, it can respond quickly but incurs a significant system execution overhead. The worst case arises with events that occur rarely yet call for fast respond to the event, what some have called "emergency events".

Finally, the "pull" model can mean that some events are missed even in the normal case, leading to inefficiencies and in some cases, incorrect behavior. Events can be missed because multiple events may occur between one poll request (by the state module) and a subsequent one.

The open source package Apache Zookeeper appears to implement a hybrid of the "pull" model by providing one-time data "watches" that are requested in the "pull" model but cause a one-time push when the watched data changes. In this design, if many watches are triggered at the same time, it is still possible to overrun the output buffers. Moreover, each watch request incurs the above overhead.

B) State-Oriented Event Protocol

In this work, a protocol for communicating events is provided that has a "state" interpretation, in the sense that each event message can be interpreted as an update to a state model. That is, there is a model that includes some number of variables that store values, and each event message can be interpreted as an update to the value of one or more of these variables. An event protocol designed accordingly is referred to as a state-oriented event protocol.

In an embodiment, this state can be factored into a plurality of identified state update units. In particular, a state update unit may be an individual entry in a collection, such as provided by a collection attribute within one of a plurality of objects. In such an embodiment, a state update unit can be identified by a specification of the object, the attribute and the key index value within this attribute.

In an embodiment, the state-oriented event protocol specifies an event message as the identification of the state update unit and the value to which it has been modified. For example, a message may contain the fields:

a) the identifier for the object,
b) identifier for the associated attribute,
c) key or index value required to identify the exact entry within the attribute, and
d) new value to be assigned to that entry.

A key aspect of a state-oriented event protocol is that, in application execution, a large number of event messages contain the same identification information as some previous event message, only differing in the "new value" field, and that the receivers of an event message of a given identification, for the most part, only require knowing the last "new value" (or a recent value) sent with this identification.

B1) Flow-controlled Connections

In the present approach, there is a communication means for transferring event messages from the source of the events to each endpoint that needs to receive the event message. In an embodiment, this means can be provided by a conventional operating system socket connection between the source and each receiver. In an embodiment, this means can also include using a shared memory segment. We refer to this means between a source and a receiver as a connection. A connection "accepts" an event message and then typically takes responsibility for providing this event message to the corresponding receiver, or else indicates failure. If a connection is unable to accept any additional event messages, it is referred to as blocked. A connection that is able to indicate whether it is blocked or whether it is accepting new messages (i.e., available) is referred to here as flow-controlled.

A flow-controlled connection is typically provided by a reliable transport protocol such as TCP (transmission control protocol) that ensures messages are received at the other end of the connection or else an indication of failure is provided. In this case, the blocking of the connection occurs when the buffering of data to transmit exceeds some limit because TCP has been unable to transmit the data contained in the buffer reliably to the receiver. However, a flow-controlled connection in some applications can be "unreliable" in the sense of losing some data as long as there is some indication when systematic loss is taking place, either because of failure or overload, which can be used to indicate the connection is blocked, and to similarly have an indication that it is able to again accept messages when the connection has recovered.

A flow-controlled connection is also rate limited, limited by the rate at which the receiver can process messages and by the rate at which the network can deliver the messages to the receiver. A connection can thus be characterized dynamically by its load level at a given time based on the rate of messages being sent over the connection relative to the maximum rate that the combination of network and receiver can handle. If the sending rate is close to this maximum, the load level is considered high. If the sending rate is far below this maximum, the load level is considered low. A load level in which the rate has so far exceeded the capacity of this connection as to exhaust its output buffer allocation is considered very high and corresponds to the above blocked state.

As the overall load on system resources goes up, the maximum rate of messages that can be supported over a connection can go down. An application can adapt by sending event messages at a lower rate on such a connection in this case. However, it is generally infeasible to do so by reducing the event rate, both because an event message may need to go to different receivers whose connections are experiencing different levels of load and because the event rate may be dictated by other factors, such as stability requirements of control algorithms. Thus, event messages for some connections need to be dropped. The present approach provides a controlled and recoverable means of doing so.

B2) Corresponding State

In embodiments of the invention, there can be, at each source of events, an instantiation of the portion of the state model that this source is responsible for updating. For example, if a process P1 is responsible for events corresponding to objects O1, O2 and O3, then P1 contains an instantiation of these objects with the state of these objects reflecting the last events generated corresponding to these objects. This state is referred to as the corresponding state for this connection and event source.

The receiving end of a connection logically has a copy of this corresponding state based on it receiving event messages reflecting updates to the source's corresponding state. On set up or recovery of a connection from a source to a receiver, if the corresponding state at the source is not in some known default or initial state that the receiver can know, the source generates a series of event messages that correspond to those required to initialize the receiver's notion of the corresponding state to that of the source. In an embodiment, the receiver explicitly stores the corresponding state in a form that directly corresponds to the state model, with the values determined by event messages received from the source. In another embodiment, the receiver does not explicitly store this state but simply takes actions in response to event messages that result in processing according to the logical state updates provided by the event messages.

In a preferred embodiment, the state is partitioned across event sources such that no two sources send event messages that correspond to the same state. In this case, if P1 last generated an event message corresponding to attribute entry AE of object O2 to the value of say 43, then object O2 as instantiated in P1 contains a variable corresponding to AE that contains the value 43.

If the state model is not strictly partitioned across event sources as above, there may be a need for a separate mechanism to deal with multiple event sources updating the same logical state variables, a mechanism such as a shared state coherency protocol, as is well-known in the art.

In an embodiment, an event is generated by writing the state model, which then causes the generating of the corresponding event message. E.g. attribute entry AE of object O2 is written by the application, causing the generation of an event message corresponding to this update. In another embodiment, this attribute entry is updated by the event message mechanism after the event message has been generated by the application. Thus, this approach can apply in the case of the application API being based on the state or in the case of it being based on events.

B3) Ancillary State: Deferred Update Metadata

Deferred update metadata is also maintained that records that an event message was not accepted by one or more connections for some reason. One reason would be the connection is backlogged because messages have been previously transmitted over the connection at a faster rate than the receiver can handle and the receiver has not yet caught up. Another reason could be that the receiver or connection has (temporarily) failed. Another reason is that the event is part of a transaction that has not yet committed. Yet another reason could be that the receiver is engaged in transaction processing in which it expects to work with a snapshot of state and events.

This ancillary state is referred to as deferred update metadata because each event message corresponds to a state update, and the above cases of a blocked connection cause this update to be deferred.

In an embodiment, this deferred update metadata is stored as a value per connection and per object/attribute/entry that has been updated but not transmitted over the connection. In an embodiment, the value can be a single bit indicating the attribute entry is "dirty", i.e. modified but not updated over the connection.

Once the connection is able to accept additional events messages, update messages for the specific deferred updates can be (re)constructed by identifying each of these so-called "dirty entries" which provides the object, attribute and key information, rereading the state of the associated attribute entry using said information from the local instantiation of the relevant portion of the state model, and copying this object/attribute/index and value information into the message. The resulting event message can then be sent over the connection. In effect, the previously dropped event message can be reconstructed from the corresponding state and the deferred update metadata.

Because the deferred update metadata only needs to store the identifying information about the update, not the updated value(s) themselves, because these values can be reread from the local instantiation of the state, the memory size of the deferred update metadata is much smaller in the expected case than the memory required to queue the event messages themselves until they can be transmitted. For example, with updates to an array of records of K bytes, the incremental deferred update metadata space cost per entry can be as low as a single bit per update message whereas each update message would include the K bytes of data as well as identifying information.

Moreover, in some applications, a rapid sequence of events can be generated that correspond to some temporary oscillation of the system or application operation. For example, the state of a switch network interface could oscillate between being up and being down if there was some temporary glitch in the hardware or the interaction with the other end of the link. This behavior then manifests itself in the state model instantiation as one or more attributes changing their values multiple times in a short period of time. If this "event storm" causes a connection to be backlogged as above, the state model is updated to the latest value that would have been transmitted, overwriting the previous value, even though this prior value may not, itself, have been transmitted. Consequently, the state model effectively coalesces a number of event messages into a single event message corresponding to the final state of this value to be sent when the connection is able to accept event messages again.

In this vein, the source may generate a new event message during the time that event messages are being reconstructed from the deferred update metadata and sent, i.e. resynchronization. In this case, this new event message causes the deferred update metadata to be further updated (because the implementation recognizes the presence of deferred update metadata even though the connection itself may not be blocked). If the event message corresponds to a variable that is later in the sequence of processing of deferred update state than its current processing, this event message simply results in its new value being sent when the deferred update processing reaches the corresponding variable. If the event message corresponds to a variable that is previous to the position of the current processing, the deferred update processing is flagged to repeat its processing once it completes its current round, causing the event message to be reconstructed and sent later. In this way, the present approach is able to efficiently handle new event messages during this resynchronization process while still providing a defined order of event messages to receivers.

This behavior allows a system using embodiments of the invention to recover faster because many event messages are effectively coalesced into one. The recovery is faster both in the sense that there are fewer messages to process on recovery as well as in the sense that the receiver is informed of the latest value sooner. This behavior means, however, that the intermediate values are lost. In the cases that the intermediate values are required by the application, the application can define an application-level queue in which new values are enqueued and old values are dequeued, thereby preserving the history. In this case, the same state-oriented event protocol can be used to update the queue. This approach allows a history of values to be transmitted and preserved for special value or attributes that require this history, rather than imposing these semantics on all attributes which, based on experience, do not normally require this history. It is thus an application-specific choice about which logical variables require a history, how long to allow this queue to become and the action to take place when the queue reaches this maximum limit. Stated differently, the queue can be regarded as a version history of a state update unit; the application can decide how long this version history should be.

It is possible for a connection to be blocked over a period in which it was to send event messages whose detailed indication in the deferred update state in total exceeds the space made available for this deferred update state. For example, a collection can be updated across a significant proportion of its total number of entries such that the space cost of storing deferred update state per modified entry becomes comparable to the space cost of storing the collection.

In an embodiment, the implementation can, in this case, delete this detailed deferred update state and only retain an indication that the collection itself needs to be, in full, resynchronized. This indication requires a fixed amount of space, namely a single bit indicator associated with the collection. When this bit is set and a connection reverts to being able to accept event messages, the entire collection is traversed to generate an event message corresponding to the current state of every value in this associated state. Thus, an implementation can dynamically switch from sending just event messages corresponding to specific values that have been updated at the cost of the deferred update state to sending all the values of the state with essentially no space cost.

In an embodiment, the deferred update state can be coalesced from per attribute entry, to per-attribute to per-object to per-group of objects to finally for all the corresponding state of a connection, as incremental steps that save on memory at the cost of more extraneous event message transmissions. Thus, it can bridge the behavior between the two extremes above of fully identified updates vs. a single bit per connection.

In an embodiment, each state update unit can have a default value. For example, the default value of a collection of integers could be for an entry to be zero (0). The deferred update state per update unit can be expanded beyond storing a bit to storing a small value per unit that can encode whether the unit was modified from its default value. Then, if a subsequent event message is generated that corresponds to updating such an unit back to its default value, the corresponding deferred update state can be deleted because this state unit has been updated back to its original value prior to the connection becoming blocked. Note that, for a sparse collection, storing a small value per update unit in the deferred update metadata is not significantly more space per collection than just storing a single "dirty" bit because of the identification overhead.

More generally, an embodiment that provides access to the value of the state update prior to the connection becoming blocked can detect when event messages update it back to this original value, and then delete the deferred update metadata for this state unit, because it has been updated back to its original value. This effectively handles the case of a sequence of event messages that in total have no effect on the corresponding state.

B4) Defined Ordering on Event Messages

In an embodiment, an ordering or partial ordering can be imposed by the state model. For instance, the entries in a collection can be ordered by key. Similarly, the attributes of an object can be ordered by their order of declaration in the definition of the state model. Finally, the objects of the state model can have a specified ordering on them, possibly defined by some ordered collection that refers to them.

In this embodiment, the generating of event messages from the corresponding state can be implemented to follow this state model ordering. For example, if a variable "foo" is defined in this ordering before variable "bar", if both foo and bar are flagged as dirty on a blocked connection, when this blocked connection unblocks, the event message for foo is guaranteed to be reconstructed and sent before the event message for bar.

In this embodiment, if the order on the state model is defined to match the normal order of events, then a receiver can rely on receiving events in the same order, whether receiving event messages as they happen or as part of recovering from a blocked connection. Defining a restricted ordering of events that a receiver can receive reduces the burden of testing the software correctness under all possible orderings, given there are fewer possible orderings. Even if it is not feasible for event messages to always match the order specified in the state model, having the order of event messages on unblock of a connection match the state model ordering reduces the testing burden to that of testing the normal ordering and the unblock or resynchronization order.

B5) Blocking of Connections

B5a) Overload Blocking of Connections

In an embodiment, the consumption of buffers associated with a connection is monitored, and the connection is blocked when the number of buffers of data waiting for transmission over a connection exceeds some threshold, measured either in buffers or bytes.

In an embodiment using the conventional operating system socket interface, the socket can be provisioned with a configured amount of output buffering, and further configured to use non-blocking I/O. Then, after a buffer of event messages is generated at the process level and written to the socket, if the write fails, indicating no more socket buffering is available, the situation is detected by checking the error return code to a socket write call, and then setting an indication on the connection that it is blocked.

The socket interface provides a signal or callback when the current I/O requests have been handled or conversely, when the socket is able to accept more event messages.

A connection can also maintain an estimated load level based on the output buffering behavior. In particular, if each output buffer is emptied immediately by transmission once filled, the load is considered low. If buffers are frequently close to full, the load is considered high (and considered very high at the point it has exhausted the buffers). Intermediate levels of use of output buffering are considered intermediate levels of load. The load level can also be computed from the rate of messages being offered for transmission. Standard techniques such as a weighted moving average calculation can be used to smoothly estimate the load over time while the buffering and or rates of offered load vary substantially.

B5b) Failure Blocking of Connections

If a network or other problem interferes with normal communication over a connection, event messages are not able to be transmitted over the connection and so it becomes blocked and thus behaves as above until the problem with the connection is corrected.

B5c) Transaction Blocking of Connections

In the case of the receiver of events performing transactional processing, it is often required that it not process any new input events during this processing if it is designed to work with a consistent snapshot of its inputs. In an embodiment, transaction processing refers to performing updates as one atomic action based on a snapshot of the state corresponding to the committed state as of the start time of the transaction, referred to in the art as snapshot isolation. In this case, the receiving process can request a snapshot as of time t, typically the current time, with the source then ensuring it has been sent all of the event messages generated before time t and then blocking the connection. The receiver proceeds with the transaction after receiving confirmation over the connection that it is blocked, performs the processing of the transaction and then commits the transaction, unblocking the connection as part of the commit processing. At this point, event messages that were blocked can be generated and sent based in the deferred update metadata, efficiently bringing the receiving process up to date after it effectively releases this snapshot requirement, typically as the last action of the commit processing.

In the case of the source performing the transaction, the connection can be blocked to avoid sending any event messages generated by the transactional processing until the transaction commits. In a preferred embodiment, the connection is only blocked from the start of the prepare-to-commit processing to the commit point by only generating the associated event messages starting during the prepare-to-commit processing.

B6) Using a Transmit Decision Function (TDF)

In an embodiment, a variable can be defined with an associated transmit decision function (TDF) that, for example, takes as parameters the load level of the connection, an indication of the difference between the new value of the variable and the receiver's previous value of this variable, and returns true or false, based on whether the event message is to be transmitted or not. In more general terms, the TDF is at least a function of the connection status, and can also be a function of additional parameters, such as number of queued messages, system load, message urgency, etc. The TDF is normally defined to favor not transmitting when the difference between old value and new value is less and the load level of the connection is high, and conversely favor transmitting when the inverse is true.

A transmit decision function can be used when, for example, there is a semantic trade-off between the accuracy of the receiver state and the real-time response of an application. An illustrative example is a distributed control application that entails the real-time monitoring and control of a factory. In this case, one node in this distributed system may generate event messages based on the temperature of a factory oven changing. Under normal circumstances, the temperature may fluctuate constantly, however slightly, causing an event message every 10 milliseconds, if that is the rate of poll of the oven sensor. Similarly, under normal circumstances, the capacity of the network and the receivers of these event messages can easily keep up with the resulting event message rate. However, under increased load on the application, this event rate may be a significant burden on the system. Nevertheless, if there is a significant change in the temperature reading, it is important to communicate this change to the receivers, one or more of which may need to take control actions.

In this setting, a TDF can be selected that only indicates to transmit the event message to a receiver if the load level on the connection to the receiver is low or the difference in temperature last indicated to the receiver relative to the new temperature reading is quite high. As a specific example function, a TDF could be computed as:

$$\mathrm{loadLevel*loadFactor-temperatureDiff*temperatureFactor<threshold}$$

where loadFactor, temperatureFactor and threshold are tunable parameters. Thus, computed using this expression, the TDF returns true if the loadLevel does not outweigh the temperature difference consideration, thereby indicating transmission. Otherwise, it returns false and the ancillary data is updated as necessary to ensure there is a record of the receiver's last indication of temperature.

Using such a suitably chosen TDF, the rate of event messages is reduced when the application is under significant load, thereby reducing the load generated by this communication, often allowing other communication in the system to take place more expeditiously and ensuring faster response to situations requiring control actions.

B7) Indirect Event Messaging

In some applications, it is beneficial to designate a separate state maintenance process or set of processes that stores the instantiated state and multicasts the event messages to the final receivers.

In this case, the true source of an event message transmits the event message to the associated state maintenance process, which then attempts to forward this event message to each designated receiver, using the techniques of this invention to defer an event message to any receiver with a blocked or loaded connection. There can be an arbitrary k such separate source processes.

This approach can provide higher availability/fault-tolerance because the instantiated state is protected in this separate process from application logic errors that might cause an original source process to fail. It also allows efficient recovery of a failed process because this state maintenance process can regenerate the event messages corresponding to all the current state it handles, rather than requiring a recovering process to connect to the k different source processes and get each of them to regenerate these event messages. It can also lead to faster recovery compared to the recovering process waiting for new event messages to provide it with sufficiently up-to-date information.

In this embodiment, an original source process can still use the techniques described herein to handle blocking or loading of its connection to this state maintenance process when the latter experiences overload or failure.

B8) Priority and Partitioning Across Multiple Connections

An event source with different categories of events can partition these categories across multiple connections, so that overload on one should not impact the latency of event messages on another. For example, if some events are high-frequency yet relatively unimportant while another category is low frequency and system critical for fast response, the latter can use a separate connection from the former. Then, if the former experiences overload, it does not effect the delivery of event messages on the latter. This is especially true if the receivers give priority to the processing of messages arriving on the connections for the latter category.

In that vein, the efficient recovery from a blocked connection allows a receiver process to more readily defer reading from a low-priority connection in favor of higher priority processing, relying on the techniques of this invention to allow fast recovery from the blocking on this connection, if this blocking does arise.

In the case of the state maintenance process structure above, each such process can also partition event messages across connections according to appropriate categories so this delivery behavior/independence is preserved.

B9) Reacting to Sustained Overload/Failure

In an embodiment, there can be means to identify when the deferred update metadata indicates that updates are being delayed beyond some threshold. In particular, the deferred update metadata can maintain statistics on how long updates have been deferred, providing an indication when that value goes over some threshold, or some percentile of that value exceeds some threshold, or similar measures.

With this indication, the source can both modify its behavior locally to reduce the event message rate, such as reducing a reporting rate, as well as report the condition by an event message to some system management process. The latter can take other actions, such as instructing other modules of the system to reduce their load, after determining whether this overload condition is local to one source process or is occurring in several. If the overhead is caused by the blocking arising from transactions, there may also be means to reduce the transaction rate.

Such notifying event messages can be classified as a separate category of event message and thus can use a separate connection to ensure prompt delivery, independent of the overloaded connections handling the "normal" event messages.

Note that deferred update state as in the present work can provide a more accurate and efficient indication of latency of update than using conventional techniques. For example, one conventional approach is to provide additional connection output buffering and simply re-establish the connection after it fails or the buffers overflow. The difficulty then is to track the time that an update can spend in this output buffering before actually being sent, which could require timestamping each event message with its time of enqueue, a potentially significant space overhead. The deferred update state effectively amortizes this cost over many updates and is reasonably accurate, especially if the output buffering is minimized by relying on the efficient "catchup" allowed by the deferred metadata.

B10) State-Oriented API

In an embodiment, the state model itself can constitute the interface to which applications are designed. That is, rather than generating event messages as above directly, the application directly updates portions of the state model, with the state model implementation reacting to each update by generating a corresponding event message which is then handled by the techniques of this invention to handle overload, failures and transactions. In such an embodiment, transactions are then used to provide atomicity across multiple state updates.

In this embodiment, the receiver of an event message updates its instantiation of the corresponding state according to the value contained in the event message and then uses local mechanisms, such as a realization of the well-known observer pattern, to provide a callback to the application to indicate this update has occurred, if so requested by the application. This, the application interface on the receiving side of events is also state-oriented with callbacks to notify the application of state changes.

B12) Heterogeneous Event Message Handling

In an embodiment, a set of events can be identified as "real-time" in the sense that the occasional dropping of these event messages is not problematic because a subsequent event message can be expected to provide adequate information. For example, an event message indicating a change in speed of a vehicle under computer control can be dropped occasionally because, by application design, a subsequent one with a further updated speed indication will be transmitted some short time later. These event messages can be structured and transmitted or dropped outside of the state-oriented regime described herein and can co-exist with this regime.

Alternatively, an unreliable connection (e.g., a connection that can silently drop information) can be used augmented with some feedback mechanism that indicates blocking when the number of messages dropped at the receiver exceeds some threshold. With this extension, real-time event messages can enjoy the benefits of the present approach.

On the other hand, some events can be known to occur so infrequently that they are cannot be the source of overhead, and thus can be transmitted outside of the techniques described herein, at the risk of possibly blocking the source if one of the connections is truly blocked. A common practice in the art is to reserve an extra portion of the buffering on a connection for such event messages when this approach is used. Another approach is to send such category of events on a separate connection.

B13) Benefits

Restricting the event messaging protocol to be strictly a state update protocol means that event messages can be dropped when communication to one or more receivers is not feasible or advisable, relying on the corresponding state to regenerate event messages at a later time, at least those messages corresponding to the current state. This avoids an unbounded space cost of queuing event messages at the source and incorrect application behavior from simply dropping event messages.

The space cost of dropped event messages can be bounded by the size of the state model and the size of the ancillary state used to record what portions of the state correspond to event messages that were dropped for each connection. The state model can be bounded based on application requirements. Moreover, the amount of ancillary state can be limited to a fixed amount by flagging the connection as needing resynchronization and deleting the ancillary state when it becomes excessive, and then retransmitting all the state relevant to the receiver at some later point.

An embodiment can trade-off the memory required for the ancillary data versus the communication and processing to (re)transmit event messages at a coarser grain level, (re) transmitting the entire state in the extreme case. Thus, an application can recover faster from overload, failure or transactional updates while strictly bounding the amount of memory it consumes.

This approach can reduce the amount of memory required for output buffering in some cases because this buffering does not need to be configured for a worst case. Instead, because the deferred update state allows efficient recovery from this situation, buffer overflow can be allowed to arise more frequently.

In particular, the event sources and receivers should be designed and provisioned such that the receivers can keep up with the event rate most of the time, i.e. there is not chronic overload. An application designer may determine that this behavior is mostly violated during failure or during temporary oscillatory scenarios or as a result of significant reconfiguration. Thus, such event sources can be configured with minimal output buffering so that the source switches to dropping event messages in favor of maintaining the deferred update state in these scenarios. This approach, beyond reducing memory requirements for output buffering, reduces the load on other parts of the system, allows more accurate detection of overload and allows the system to recover faster from the condition.

The use of a transmit decision function advantageously allows a smooth trade-off between loading the connection and receiver versus the currency of the receiver state. In real-time control systems, this approach can allow the system to remain responsive to significant sensor changes even under significant load.

The reduced cost of blocking a connection also means a receiver is more free to prioritize its processing independent of particular connections, if the load so demands. I.e. a connection can become blocked because the processing of its event messages was deprioritized by receiver in favor of higher priority tasks.

Finally, detecting and reacting to overload/failures can be more accurate.

The invention claimed is:

1. A method, comprising:
    connecting a local node with a plurality of remote nodes via a plurality of corresponding connections, wherein:
        the local node has a local state that is specified according to a state model, wherein:
            the local state corresponds to a plurality of elements that have a pre-determined order;
            the plurality of elements includes a plurality of variables that are configured to store a corresponding plurality of values;
            the pre-determined order specifies an order of the plurality of variables, wherein for a first variable ordered before a second variable in the pre-determined order, a first event message associated with the first variable is guaranteed to be reconstructed and sent before a second event message associated with the second variable; and
        the plurality of connections are associated with a plurality of corresponding atemporal connection states;
    in the event that a connection among the plurality of corresponding connections becomes blocked, updating an atemporal connection state associated with the connection that is blocked to track changes that were made but not transmitted;
    in response to the connection changing from blocked to available, transmitting one or more recovery messages relating to changed elements among the plurality of elements, wherein the one or more recovery messages are transmitted according to the pre-determined order of the plurality of elements corresponding to the local state.

2. The method of claim 1, wherein the plurality of connections include one or more flow controlled connections.

3. The method of claim 1, wherein the plurality of connections include one or more socket connections, one or more shared memory segments, or both.

4. The method of claim 1, wherein the plurality of connections are capable of reporting their respective connection statuses.

5. The method of claim 1, further comprising invoking a transmit decision function to determine whether to transmit an event message.

6. The method of claim 1, further comprising invoking a transmit decision function that determines availability of connections by comparing a current load level of the connection with a previous load level of the connection.

7. The method of claim 1, wherein the corresponding connection in the plurality of corresponding connections is configured to report a connection status of blocked in the event that buffered data to be transmitted exceeds a limit.

8. The method of claim 1, wherein the connection is determined to be blocked based at least in part on a load level associated with the connection.

9. The method of claim 1, wherein the atemporal connection state includes ancillary state that identifies elements of the atemporal connection state that have been changed, but not transmitted.

10. The method of claim 1, further comprising reporting a connection status as blocked due to one or more of: connection overload, connection failure, and/or transaction processing.

11. A system, comprising:
    one or more processors configured to:
        connect a local node with a plurality of remote nodes via a plurality of corresponding connections, wherein:

the local node has a local state that is specified according to a state model, wherein:
the local state corresponds to a plurality of elements that have a pre-determined order;
the plurality of elements includes a plurality of variables that are configured to store a corresponding plurality of values;
the pre-determined order specifies an order of the plurality of variables, wherein for a first variable ordered before a second variable in the pre-determined order, a first event message associated with the first variable is guaranteed to be reconstructed and sent before a second event message associated with the second variable; and
the plurality of connections are associated with a plurality of corresponding atemporal connection states;
in the event that a connection among the plurality of corresponding connections becomes blocked, update an atemporal connection state associated with the connection that is blocked to track changes that were made but not transmitted;
in response to the connection changing from blocked to available, transmit one or more recovery messages relating to changed elements among the plurality of elements, wherein the one or more recovery messages are transmitted according to the pre-determined order of the plurality of elements corresponding to the local state; and
one or more memories coupled to the one or more processors and configured to provide the one or more processors with instructions.

12. The system of claim 11, wherein the plurality of connections include one or more flow controlled connections.

13. The system of claim 11, wherein the plurality of connections include one or more socket connections, one or more shared memory segments, or both.

14. The system of claim 11, wherein the plurality of connections are capable of reporting their respective connection statuses.

15. The system of claim 11, wherein the one or more processors are further configured to invoke a transmit decision function to determine whether to transmit an event message.

16. The system of claim 11, wherein the one or more processors are further configured to invoke a transmit decision function that determines availability of connections by comparing a current load level of the connection with a previous load level of the connection.

17. The system of claim 11, wherein the corresponding connection in the plurality of corresponding connections is configured to report a connection status of blocked in the event that buffered data to be transmitted exceeds a limit.

18. The system of claim 11, wherein the connection is determined to be blocked based at least in part on a load level associated with the connection.

19. The system of claim 11, wherein the atemporal connection state includes ancillary state that identifies elements of the atemporal connection state that have been changed, but not transmitted.

20. The system of claim 11, wherein the one or more processors are further configured to report a connection status as blocked due to one or more of: connection overload, connection failure, and/or transaction processing.

21. A computer program product embodied in a tangible non-transitory computer readable storage medium and comprising computer instructions for:
connecting a local node with a plurality of remote nodes via a plurality of corresponding connections, wherein:
the local node has a local state that is specified according to a state model, wherein:
the local state corresponds to a plurality of elements that have a pre-determined order;
the plurality of elements includes a plurality of variables that are configured to store a corresponding plurality of values;
the pre-determined order specifies an order of the plurality of variables, wherein for a first variable ordered before a second variable in the pre-determined order, a first event message associated with the first variable is guaranteed to be reconstructed and sent before a second event message associated with the second variable; and
the plurality of connections are associated with a plurality of corresponding atemporal connection states;
in the event that a connection among the plurality of corresponding connections becomes blocked, updating an atemporal connection state associated with the connection that is blocked to track changes that were made but not transmitted;
in response to the connection changing from blocked to available, transmitting one or more recovery messages relating to changed elements among the plurality of elements, wherein the one or more recovery messages are transmitted according to the pre-determined order of the plurality of elements corresponding to the local state.

\* \* \* \* \*